3,101,320
CONDITIONING CYANIDE COMPOUNDS

Leslie E. Lancy, Ellwood City, Pa., assignor to Lancy Laboratories, Inc., Zelienople, Pa., a corporation of Pennsylvania
No Drawing. Filed Jan. 11, 1961, Ser. No. 81,921
9 Claims. (Cl. 210—62)

This invention pertains to conditioning waste materials such as contained in waste waters, and to converting toxic cyanide compounds and particularly, iron cyanides into non-toxic compounds in order that they may be discharged into streams without danger to living organisms, fish, etc.

The toxic effect of metal cyanides, such as produced in metal finishing, heat treating, wet mining and other processes employing cyanides, is well known. Although iron cyanide compounds have been considered to be non-toxic, they tend to convert into simple cyanide compounds when discharged into the open due to the action of sunlight and thus, become toxic due to the liberation of free cyanide.

The most common method of eliminating cyanide compounds in waste waters involves alkaline chlorination wherein chlorine gas or hypochlorites at an alkaline pH are used. This results in converting cyanide compounds into less toxic cyanates which may then be chlorinated to accomplish a final breakdown into carbon dioxide and hydrogen gases. However, in some metal finishing and other processes, including mining floatation and leaching, where iron is present, the cyanide chemicals react to form iron cyanides. Although iron cyanide compounds do not have very tight chemical bonds, they are not oxidized or broken-down by the alkaline chlorination used for treatment of other compounds.

In my co-pending application Serial No. 797,569 of March 6, 1959, now U.S. Patent No. 2,981,682, entitled "Chlorination of Water Soluble Iron Cyanide Compounds Using Mercuric Chloride Catalyst," I have disclosed a procedure for eliminating iron cyanides and cyanide contamination due to photo or sun decomposition, etc. by employing a mercuric chloride as a catalyst, in order to enable the completion of the chlorination of intermediate iron cyanide. This has been a highly successful procedure and has marked an important advance in the art. By it, I have been able to accomplish a complete conditioning treatment of cyanide compounds containing at least iron cyanide into non-toxic compounds and to do so while breaking-down simple cyanides that may be present, all in a selective manner in the same waste or aqueous waste solution. In such a process I have been able to free the mercury salts so as to re-use them. However, in accordance with my present invention, I have discovered that the breakdown of the iron cyanide compounds can be effectively accomplished without the use of such a catalyst and thus, in a simplified procedure, but under conditions tending to require a slightly greater time period of conditioning.

It has thus been an object of my present invention to devise an inexpensive and simplified procedure or treatment for converting or eliminating iron cyanides and thus, toxic contamination in waste;

Another object has been to devise a process or treatment in accordance with which waste-containing cyanides which may include simple cyanide compounds and at least some iron cyanide compounds, may be effectively made non-toxic without the use of a catalyst;

A further object of my invention has been to convert iron cyanides into simple cyanides and in an alkaline chlorination solution by the utilization of control features;

These and other objects of my invention will appear to those skilled in the art from the specification and the claims.

I have discovered in conducting plant size operations that it is possible to chlorinate iron cyanides, even without the employment or addition of a catalyst. Surprisingly, this can be effected by raising the temperature of the waste (aqueous) solution so as to increase the oxidation potential of the chlorine which is made available, although at room temperatures the free chlorine will not react on iron cyanide compounds at all, even after relatively long holding periods. For example, I have applied a free chlorine content of 1 gram per liter and after periods of 24, 48, 72, etc. hours, there has been no measurable or noticeable loss of iron cyanide. However, if the solution is heated above 160° F. and provided with free chlorine in a concentration of at least .5 gram per liter or higher, the chlorine will start to react with the iron cyanide. I have determined that the chlorine is consumed rapidly as the reaction starts and that the chlorine content has to be maintained in order to maintain the reaction. In other words, a sufficiently high concentration of free chlorine has to be provided before the reaction starts and a sufficient quantity has to be available to complete the reaction and maintain at least about .5 gram per liter of free chlorine, all throughout the reaction and until it is completed.

As pointed out in my above-mentioned co-pending application, attempts to precipitate iron cyanides with heavy metals, such as iron, nickel, copper, zinc, etc., under acidic conditions and also by subjecting the waste to ultraviolet radiation are time-consuming and expensive approaches which are not fully satisfactory, where as often is the case, the iron cyanide compounds are contained in the same waste that also contains other cyanide compounds. Thus it is advantageous to avoid an acidic solution, since an alkaline type is needed for removing simple alkaline cyanides with chlorine, and such a process is wasteful of acid. In addition, acidification cannot be accomplished before the simple cyanides are chlorinated, since otherwise highly toxic hydrocyanic gas is formed from the mixing of acid and cyanide salts. Metal iron cyanide complexes produced are colored and set-up turbidity of the effluent and the acidic waste has to be neutralized as a final step. Ultraviolet treatment is also highly time consuming and costly and lacks efficiency, particularly when dealing with turbid waste effluents which tend to screen-out too much of short wave length light from the body of the liquid.

My present invention deals with the approach of employing an alkaline solution throughout and accomplishing the conditioning progressively and preferentially of all the cyanide compounds, including the iron cyanides, without the use of a catalyst. In carrying-out my procedure, I employ a batch treatment which involves first chlorinating simple cyanides to completely break them down and to, at the same time, convert ferrocyanides into ferricyanides. Only one cyanide molecule is oxidized by the chlorine from the standpoint of chemical material balance of the chlorine. The breakdown chemicals are alkaline metal chloride, carbonate, formate, cyanate, ammonia, carbon dioxide, nitrogen gases and ferric hydroxide. The following equations are exemplary of the first operation:

(1) $Cl_2 + 2NaOH \rightarrow NaOCl + H_2O$
(2) $NaCN + NaOCl \rightarrow NaCNO + NaCl$
(3) $2NaCNO + 3NaOCl + H_2O$
$\rightarrow 2CO_2 + N_2 + 3NaCl + 2NaOH$ Reaction 1 shows that the chlorine gas forms sodium hypochlorite which is the reacting chemical in effecting chlorination. Reaction 2 shows that a simple cyanide compound, such as sodium or potassium cyanide, is converted into a cyanate by chlorination; Reaction 3 shows that a further chlorination of the cyanate to carbon dioxide and nitrogen gases is accomplished and that the chlorine consumed is ultimately converted into a chloride. The first chlorination also effects an oxidizing conversion of all the ferrocyanides, $Fe(CN)_6$, into ferricyanides and this may be accomplished even at room temperature.

In the final reactions accomplished in accordance with my invention, the batch is heated to a temperature of at least 160° F. or higher to make the free chlorine effective for splitting-off one cyanide molecule from the ferricyanide ion. This cyanide molecule is then oxidized to the cyanate form which is unstable and which will break into formate or ammonia, or carbon dioxide and nitrogen. The remaining pentaferrate, $Fe(CN)_5$, is also unstable and will break down into ferric hydroxide, while the cyanide molecules break into formate, ammonia, carbon dioxide, nitrogen and nitrogen trioxide. At certain stages, each of these elements may be found in the solution. Since they are all considered non-toxic, the quantitative content of each compound in the final waste is immaterial.

I have determined that it is essential in carrying-out the second stage of my treatment or process, in order to accomplish an oxidation (break-down) of the iron cyanides, to maintain a temperature of at least about 160° F. Even at this temperature the oxidation is rather slow. However, in the optimum temperature range of about 180 to 200° F., a two gram per liter original iron cyanide concentration in solution will be oxidized in about three to four hours, using an optimum amount of free chlorine available of about 1 to 2 grams per liter throughout the reaction. More than this quantity of available free chloride is not harmful to the reaction, but tends to be wasteful, since some chlorine is lost due to the high temperature and the escape of chlorine ($Cl_2$) in gaseous form. Although higher temperatures than 200° may be faster insofar as reaction time is concerned, they tend to be wasteful from a chlorine consumption standpoint.

Under optimum conditions, approximately three weight units of chlorine will be consumed for the breakdown of one weight unit of $Fe(CN)_6$. In accordance with this process, chlorine is the only chemical consumed in the reactions for the chlorination of the cyanides. The pH has to be maintained within an alkaline range to assure that the secondary or final breakdown accomplished as to the ferricyanide compounds will be cyanate salts that are non-toxic and that may break down further. As in my process involving a mercury chloride catalyst, the treatment is effected selectively, preferably by initially operating at room temperature for the first part of the procedure and then, finally operating at an elevated temperature for the second part thereof. I have determined that an elevated temperature may be used throughout, if desired. Agitation or stirring of the waste solution may be accomplished, and is helpful particularly during the second part of the procedure.

After the first or preliminary treatment, the waste solution may contain about one gram per liter of sodium ferrocyanide and, for the purpose of this first treatment, I raise the pH from 9 to 11 by the addition of an alkaline metal hydroxide or carbonate, and then add chlorine or hypochlorite to establish the necessary oxidizing conditions. The chlorine content is maintained sufficient throughout both the first and second portions of the process to enable a completion of the reactions and particularly, from the standpoint of the iron content. This may be accomplished by further additions of the available chlorine or hypochlorite. In other words, a free chlorine excess is maintained throughout.

In carrying out my procedure or treatment, I prefer to stir the solution and particularly, during the portion thereof involving the break-down or the reactions as to the ferricyanides. Although the time required for my present approach to the problem is slightly greater than that required employing a catalyst in accordance with the invention of my co-pending application, the present procedure is a simplified one and is somewhat less expensive, in that it eliminates the need for the use of a catalyst.

What I claim is:

1. A procedure for conditioning waste containing cyanide compounds and at least iron cyanide which comprises while maintaining an alkalinity of the waste, chlorinating the waste and converting the iron cyanide into an intermediate iron cyanide product, and completing the chlorination of the intermediate iron cyanide into a non-toxic iron compound by maintaining an excess of free chlorine of at least about .5 of a gram per liter and a temperature of at least about 160° F. until the chlorination is completed.

2. A procedure as defined in claim 1 wherein, the temperature is maintained within a range of about 180° to 200° F.

3. A procedure as defined in claim 1 wherein the temperature application for the chlorination of the intermediate iron cyanide is maintained for about three to four hours.

4. A procedure as defined in claim 1 wherein a free chlorine content is maintained of about 1 to 2 grams per liter during the completion of the chlorination of the intermediate iron cyanide product.

5. A procedure for conditioning waste solution containing at least iron cyanide which comprises while maintaining an alkalinity of the waste, converting the iron cyanide from a ferrocyanide into a ferricyanide, and maintaining a free chlorine content of at least about .5 of a gram per liter in the waste while heating the waste to a temperature of at least about 160° F. to complete the conversion of the ferrocyanide into ferric hydroxide.

6. A procedure as defined in claim 5 wherein the waste solution is agitated during the application of the heat and the conversion of ferrocyanide into ferric hydroxide.

7. A procedure for conditioning a waste solution containing simple cyanide compounds in the nature of alkaline cyanides and an iron cyanide which comprises, making the waste solution alkaline and maintaining the alkaline condition while: chlorinating the alkaline waste solution to convert the simple cyanide compounds into non-toxic compounds and the iron cyanide into an intermediate iron cyanide reaction product, after completion of the first step providing a free chlorine content in the waste solution of at least about .5 of a gram per liter, and heating the solution to a temperature of at least about 160° F., and maintaining such free chlorine content and such temperature until the chlorination of the intermediate iron cyanide reaction product into a non-toxic iron compound is completed.

8. A procedure as defined in claim 7 wherein the temperature is maintained within a range of about 180° to 200° F.

9. A procedure as defined in claim 7 wherein, a free chlorine content of about 1 to 2 grams per liter is maintained, the waste solution is agitated during the chlorination of the intermediate iron cyanide reaction product into a non-toxic iron compound, and the temperature application is maintained for about 3 to 4 hours during such chlorination of the intermediate iron cyanide reaction product.

References Cited in the file of this patent
UNITED STATES PATENTS 2,981,682     Lancy _____ Apr. 25, 1961

OTHER REFERENCES

Smith's College Chemistry by James Kendall, third revised edition, D. Appleton, Century Company, N.Y. (1935), pp. 77–79.

Industrial Chemistry by E. R. Riegel, fourth edition, Reinhold Publishing Corp., N.Y. (1942), pp. 472–475.